United States Patent
Ham et al.

(10) Patent No.: US 9,717,384 B2
(45) Date of Patent: Aug. 1, 2017

(54) APPARATUS AND METHOD OF CONTROLLING OPERATION OF CLEANER

(75) Inventors: Jong-Gyu Ham, Suwon-si (KR); Hee-Jun Song, Yongin-si (KR)

(73) Assignee: SAMSUNG ELECTRONICS CO., LTD, Suwon-si, Gyeonggi-Do (KR)

(*) Notice: Subject to any disclaimer, the term of this patent is extended or adjusted under 35 U.S.C. 154(b) by 957 days.

(21) Appl. No.: 13/333,852

(22) Filed: Dec. 21, 2011

(65) Prior Publication Data

US 2012/0158915 A1 Jun. 21, 2012

(30) Foreign Application Priority Data

Dec. 21, 2010 (KR) ........................ 10-2010-0131663

(51) Int. Cl.
*A47L 9/28* (2006.01)
*H04L 29/08* (2006.01)

(52) U.S. Cl.
CPC .......... *A47L 9/2868* (2013.01); *A47L 9/2857* (2013.01); *H04L 67/125* (2013.01); *A47L 2201/00* (2013.01); *A47L 2201/022* (2013.01); *A47L 2201/06* (2013.01)

(58) Field of Classification Search
CPC .......... A47L 2201/00; A47L 2201/022; A47L 9/2868; H04L 67/125
See application file for complete search history.

(56) References Cited

U.S. PATENT DOCUMENTS

| | | | | |
|---|---|---|---|---|
| 7,376,487 | B2 * | 5/2008 | Kumhyr | B25J 19/005 318/568.12 |
| 8,154,246 | B1 * | 4/2012 | Heitmann | 320/109 |
| 8,285,460 | B2 * | 10/2012 | Hoffman et al. | 701/50 |
| 8,295,979 | B2 * | 10/2012 | Thacher et al. | 700/250 |
| 8,615,355 | B2 * | 12/2013 | Inbarajan | B60L 11/1809 701/123 |
| 8,755,936 | B2 * | 6/2014 | Friedman et al. | 700/248 |
| 8,838,268 | B2 * | 9/2014 | Friedman et al. | 700/245 |
| 9,091,559 | B2 * | 7/2015 | Hancock | B60L 3/12 |
| 2005/0204505 | A1 | 9/2005 | Kashiwagi | |
| 2006/0059872 | A1 | 3/2006 | Lee et al. | |
| 2012/0083930 | A1 * | 4/2012 | Ilic et al. | 700/287 |
| 2014/0207280 | A1 * | 7/2014 | Duffley et al. | 700/257 |

FOREIGN PATENT DOCUMENTS

| | | |
|---|---|---|
| CN | 1751651 A | 3/2006 |
| JP | 2005-118354 | 5/2005 |
| JP | 2005-218559 | 8/2005 |
| KR | 20040062236 A | 7/2004 |

(Continued)

OTHER PUBLICATIONS

International Search Report dated Jul. 25, 2012 in connection with International Patent Application No. PCT/KR2011/009792, 5 pages.

(Continued)

*Primary Examiner* — Aaron Strange

(57) ABSTRACT

An apparatus controls operations of a cleaner. The apparatus comprises a network interface unit for receiving first information regarding external conditions through an external network, and a controller for setting up operating schedules of the cleaner based on the first information.

13 Claims, 4 Drawing Sheets

(56) References Cited

FOREIGN PATENT DOCUMENTS

KR        20050052826 A      6/2005
KR     10-2007-0102197      10/2007

OTHER PUBLICATIONS

Written Opinion of International Searching Authority dated Jul. 25, 2012 in connection with International Patent Application No. PCT/KR2011/009792, 7 pages.
First Chinese Office Action dated Jun. 12, 2015 in connection with Chinese Patent Application No. 201180061832.9; 19 pages.
Second Office Action dated Jan. 19, 2016 in connection with Chinese Patent Application No. 201180061832.9; 15 pages.
State Intellectual Property Office of the P.R.C., "Fourth Office Action," Application No. 201180061832.9, Nov. 7, 2016, publisher SIPO, Department: Photoelectric Technology Invention Examination Department, Jiangsu Patent Examination Cooperation Center, Beijing Shi, China.
Yin Shu-Gang, et al., "A Smart Power Utilization System Based on Real-Time Electricity Prices," Power System Technology, vol. 33, No. 19, Nov. 2009, 6 pages, publisher China Academic Journal Electronic Publishing House.
Foreign Communication From a Related Counterpart Application, Korean Application No. 10-2010-0131663, Notice of Non-Final Rejection dated Apr. 20, 2017, 24 pages.

\* cited by examiner

APPARATUS AND METHOD OF CONTROLLING OPERATION OF CLEANER

CROSS-REFERENCE TO RELATED APPLICATION(S) AND CLAIM OF PRIORITY

The present application is related to and claims the benefit of Korean Patent Application No. 10-2010-0131663, filed on Dec. 21, 2010, in the Korean Intellectual Property Office, the disclosure of which is incorporated herein in its entirety by reference.

TECHNICAL FIELD OF THE INVENTION

One or more aspects of the present invention relate to apparatuses and methods of controlling operations of a cleaner, and more particularly, to an apparatus and method of controlling operations of a cleaner by using combined conditions information of external and internal conditions information to set up a cleaning schedule or a charging schedule of the cleaner.

BACKGROUND OF THE INVENTION

Today's robotic cleaners include cleaning functions, such as complete cleaning, partial cleaning, reserved cleaning, etc. Regarding the reserved cleaning, up until now, the robot cleaners have only supported passive scheduling, meaning that they start automatic cleaning at specific times that have been passively scheduled by a user. A robot cleaner's intelligence is focused on how much more quickly and carefully it runs to clean a given space. Like conventional cleaners, robot cleaners are also evaluated according to normal performance, such as, noise levels, suction power, etc. Conventional robot cleaners return to charging stations and recharge themselves if their battery-charge level drops below a predetermined level. In this case, how well a robot cleaner finds the way to and docks with the charging station is also considered a performance to be evaluated.

Since robot cleaners are user-friendly products that combine robots and consumer appliances, not only robot industries but also consumer electronics industries are entering the robot cleaner business. Furthermore, due to the increasing number of products and various uses, robot cleaner markets are attracting more and more consumers and are expected to have a high growth potential.

SUMMARY OF THE INVENTION

To address the above-discussed deficiencies of the prior art, it is a primary object to provide methods and apparatuses for setting up cleaning and charging schedules of cleaners by applying information technology (IT) to the cleaners, so that the cleaners can be used more actively and intelligently.

According to an aspect of the present disclosure, there is provided an apparatus for controlling operations of a cleaner, the method comprising: a network interface unit for receiving first information regarding external conditions through an external network; and a controller for setting up operating schedules of the cleaner based on the first information.

The operating schedules may include at least one of cleaning and charging schedules of the cleaner.

The first information may include weather information.

The first information may include smart metering information.

The smart metering information may include at least one of electricity usage amounts of other devices from among a plurality of information about a real-time pricing system based on which electricity prices are varied on an hourly basis.

The first information may include user schedule information.

The apparatus for controlling operations of a cleaner may include an internal information collector for detecting second information that corresponds to internal information of the cleaner, wherein the controller sets up operating schedules of the cleaner based on at least one of the first and second information.

The second information may be related to a dust uptake rate per hour.

The apparatus for controlling operations of a cleaner may include a storage unit for storing cleaning or charging schedules established in advance, wherein the second information is related to the cleaning or charging schedules stored in the storage unit.

The second information may be related to a remaining battery amount of the cleaner.

According to another aspect of the present disclosure, there is provided a method of controlling operations of a cleaner, the method comprising, receiving first information regarding external conditions through an external network; and setting up operating schedules of the cleaner based on the received first information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged cleaner-based network.

Figure 1:
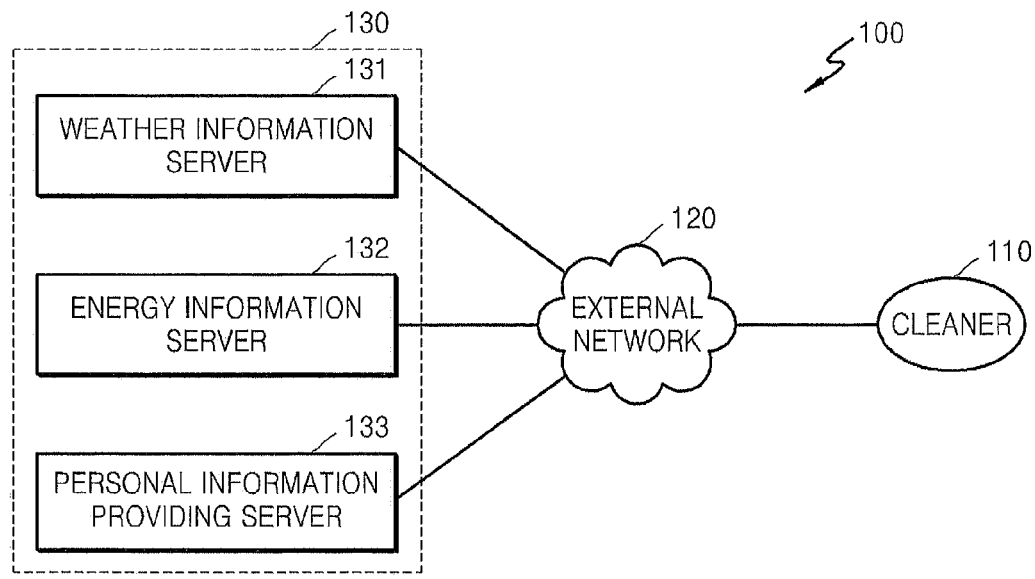
FIG. 1 illustrates of a cleaner-based network, according to the present disclosure.

FIG. 1 illustrates a cleaner-based network 100, according to the present disclosure.

Referring to FIG. 1, the network 100 includes a cleaner 110, an external network 120, and an accessible area 130 that is accessible to the cleaner 110 via the external network 120.

The external network 120 may include at least one type of network, such as Internet, a mobile communications network, a broadcasting network, a cable television network, and/or a satellite network, but is not limited thereto. The external network 120 may also be referred to as an external service network or an external access network, but is not limited thereto.

The accessible area 130 may include a weather information server 131, an energy information server 132, and a personal information providing server 133, but is not limited thereto. The weather information server 131, the energy information server 132, and the personal information providing server 133 may be each referred to as an external conditions information provider that provides external conditions information. The external conditions information refers to overall information about the external conditions surrounding the cleaner 110. For example, the external conditions information includes weather information, energy information, such as smart metering information, and personal information, such as user schedules. The external conditions information is not limited thereto and may include any information regarding cleaning or charging operations of the cleaner 110, which can be obtained from outside of the cleaner 110. The weather information server 131 provides weather information for the cleaner 110, the energy information server 132 provides energy-related information, such as, information about electric power, for the cleaner 110, and the personal information providing server 133 provides the cleaner 110 with personal information, such as, user schedule information or user position information. With the development of smart-phones, such as, for example, i-Phones® and Galaxy Phones®, almost all information may be accessible by using a smart-phone. In this example, the smart-phone may also become the external conditions information provider, or may be an intermediate information provider of any of the external conditions information providers 131-133. The external conditions information providers 131-133 included in the accessible area 130 may not be restricted to serve as external conditions information providers, but may also be referred to and serve as service providers.

The external conditions information providers 131-133 may provide the external conditions information at the request of the cleaner 110. Alternatively, when the cleaner 110 is connected to the external conditions information providers 131-133 and the external conditions information providers 131-133 have stored access information about the cleaner 110, the external conditions information providers 131-133 may provide the information for the cleaner 110 periodically or whenever an event occurs.

The external conditions information providers 131-133 may also include databases. The databases may be referred to as external databases as viewed from the cleaner 110. If the accessible area 130 includes a database server (not shown), the database server may also be referred to as an external database.

Herein, the cleaner 110 does not mean a passive device that needs to be held and driven by a user, but means an automatic device that automatically cleans and recharges itself according to a program or a schedule. In the current embodiment of the present disclosure, the cleaner 110 may be a so-called robot cleaner. The robot cleaner is also called a 'robotic vacuum' or an 'automatic domestic vacuum cleaner'. The cleaner 110 may access any of the external conditions information providers 130 via the external network 120. The cleaner 110 may further include a function to collect internal information of the cleaner 110.

Figure 2:
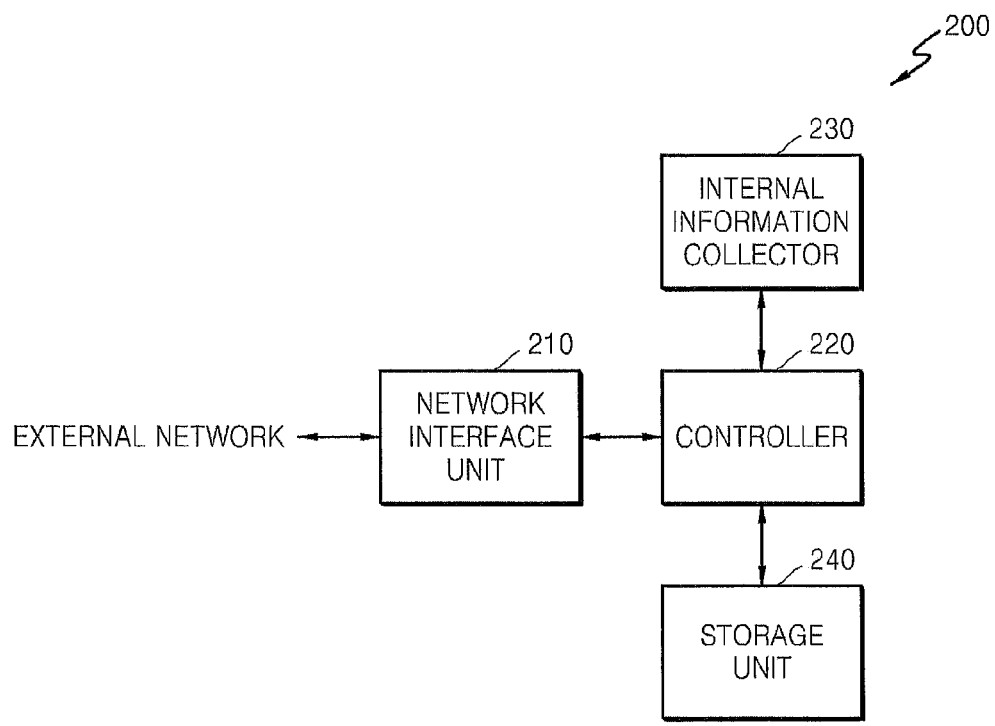
FIG. 2 illustrates an apparatus for controlling operations of a cleaner, according to the present disclosure.

FIG. 2 illustrates an apparatus for controlling operations of the cleaner 110, according to the present disclosure. The apparatus is contained in the cleaner 110 of FIG. 1.

Referring to FIG. 2, the apparatus 200 for controlling operations of the cleaner 110 includes a network interface unit 210, a controller 220, a storage unit 240, and an internal information collector 230.

The network interface unit 210 provides an interface function to transmit and receive data between the external network 120 and the controller 220. The data to be received through the interface unit 210 in response to a status of the apparatus 200 includes external conditions information. The external conditions information may include weather information, energy-related information, and user personal information.

The controller 220 includes a processor(s) or a microprocessor(s) for controlling overall functions of the apparatus 200, but is not limited thereto. The controller 220 receives the external conditions information through the network interface unit 210 and sets up an operating schedule of the cleaner 110 based on the external conditions information. The controller 220 may create a new operating schedule of the cleaner 110 or update an existing operating schedule stored in the storage unit 30. The operating schedule of the cleaner 110 implies a cleaning or charging schedule of the cleaner 110.

The operations of the apparatus 200, in response to the external conditions information, will now be described in detail.

An example where the external conditions information is weather information is described at first.

The weather information includes at least one of information about weather, temperature, humidity, wind velocity, amount of sunshine, and air pollution level, such as a yellow dust level. Among others, the information about the air pollution level, such as the yellow dust level, is information that indicates an increased need for cleaning. Therefore, when receiving information about such air pollution level, the controller 220 sets up an operating schedule, particularly a cleaning schedule of the cleaner 110.

The example of the cleaning schedule of the cleaner 110 set up based on the weather information is shown in Table 1.

TABLE 1

| Stored Cleaning start time | Established Cleaning start time |
|---|---|
| 02:00 p.m. | 11:00 a.m. |
| 08:00 p.m. | 02:00 p.m. |
|  | 05:00 p.m. |
|  | 08:00 p.m. |

Referring to Table 1, when receiving the air pollution information from the weather information server 131 through the network interface unit 210, the controller 220 changes a pre-assigned cleaning schedule, that is, cleaning twice a day at 2 p.m. and 8 p.m. by increasing the number of times cleaning is performed and re-establishing the cleaning schedule to cleaning 4 times a day at 11 a.m., 2 p.m., 5 p.m., and 8 p.m. If no cleaning schedule has been stored in advance, such a four times a day cleaning schedule may be newly established. Cleaning hours and space per one time cleaning may be set up by a user. In addition, the controller 220 may also set up a charging schedule of the cleaner 110 in response to weather information. Table 1 is just an example and thus the number of cleaning times may be changed depending on the air pollution level.

Next, an example where the external conditions information is energy information is described. According to an embodiment of the present disclosure, the energy information may be smart metering information. A smart grid is technology that collects energy information, such as electric power consumed by respective devices, through smart metering, thus increasing economic efficiency of energy usage. Smart metering is a revolutionary future technology developed to overcome the limit of currently centralized power distribution networks and facilitate suppression of pollution emissions and improve power efficiency. The smart metering information may include information about a real-time pricing system according to which electricity prices change on an hourly basis, and information about the amount of energy consumed by other devices. Under the real-time pricing (hereinafter, referring to as RTP) system, consumers are billed for the electricity they consume based on hourly prices that have been set by an electricity provider (e.g., KEPCO in Korea).

Accordingly, when receiving RTP information that is included in smart metering information, the controller 220 may schedule cleaning or charging operations based on a predetermined criteria. For example, the controller 220 may schedule cleaning or charging operations to be performed during lower-priced hours, avoiding higher-priced hours. In addition, the controller 220 may set RTP levels from the RTP information based on predetermined criteria and schedule cleaning or charging operations of the cleaner 110 accordingly. Scheduling by setting the RTP levels may simplify and give higher reliance to the scheduling program than by hourly-based scheduling.

Figure 3:
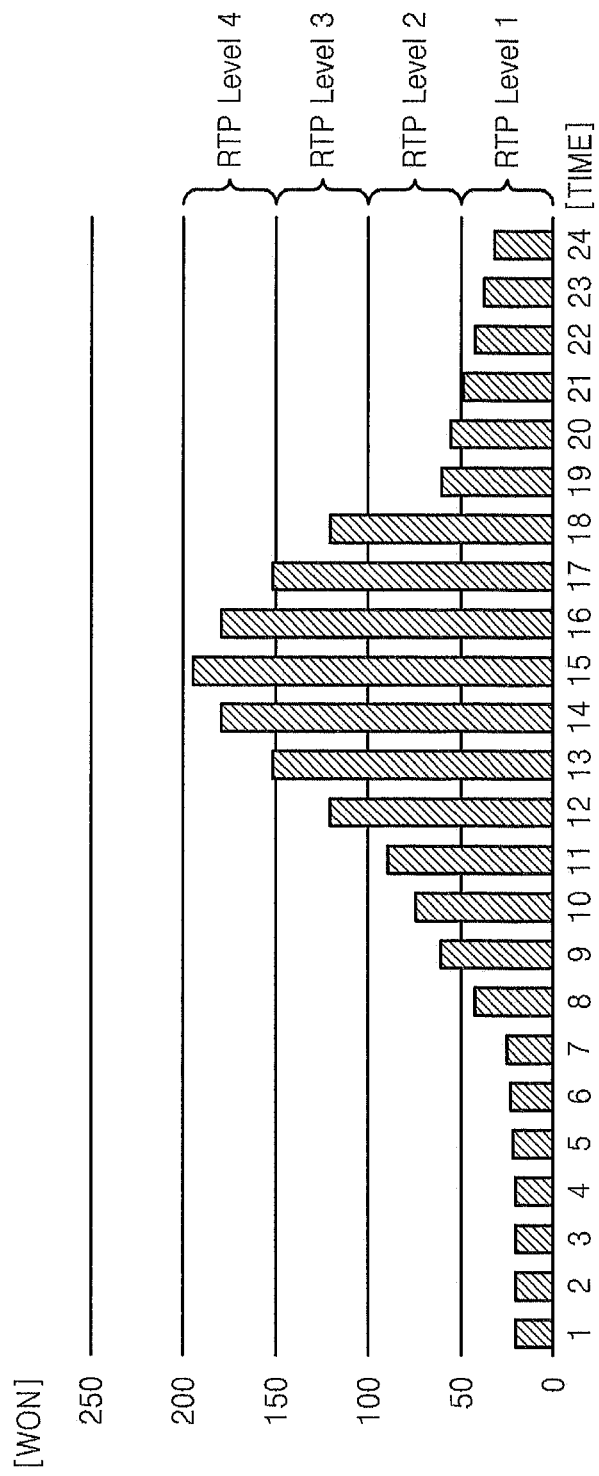
FIG. 3 illustrates exemplary real-time pricing (RTP) levels at hourly intervals, according to the present disclosure.

FIG. 3 illustrates exemplary real-time pricing (RTP) levels at hourly intervals, according to the present disclosure.

In the example illustrated in FIG. 3, the horizontal axis represents time while the vertical axis represents consumer prices. Specifically, 24 hours are represented in the horizontal axis, while consumer prices (in Korean Won) of electricity per kWh are represented in the vertical axis. RTP Level 1, the lower-priced level, is assigned to consumer prices whose prices per kWh<50, RTP Level 2, the medium-priced level, is assigned to consumer prices whose 50≤prices per kWh<100, RTP Level 3, the higher-priced level, is assigned to consumer prices whose 100 prices per kWh<150, and RTP Level 4, the highest-priced level, is assigned to consumer prices whose prices per kWh≥150. As the RTP level increases, electricity price also increases. In FIG. 3, time zones from 1 to 8 and 21 to 24 are assigned to RTP level 1, time zones from 9 to 12 and 19 to 20 are assigned to RTP Level 2, a time zone from 12 to 18 is assigned to RTP Level 3, and a time zone from 13 to 17 is assigned to RTP Level 4. If electricity is used during the time zone from 13 to 17 that belongs to RTP level 4, the electricity is consumed at the highest price. The electricity provider may alter RTP, and a manufacturer or user of the cleaner 110 may also alter the RTP levels.

As such, the controller 220 may set up cleaning or charging schedules of the cleaner 110 according to RTP levels as in Table 2. Table 2 illustrates a schedule representing whether to do cleaning or charging according to RTP levels.

TABLE 2

| Operation | RTP Level 1 | RTP Level 2 | RTP Level 3 | RTP Level 4 |
|---|---|---|---|---|
| Cleaning | ○ | ○ | X | X |
| Charging | ○ | X | X | X |

Referring to Table 2, each column represents an RTP level, each row represents either a cleaning or charging operation, and each cell where a column and a row meet represents whether to perform the cleaning or charging operation. When receiving RTP information from the weather information server 131 through the network interface unit 210, the controller 220 only allows for cleaning at RTP Level 1 or 2, but not at RTP Level 3 or 4. The controller 220 only allows for charging at RTP Level 1, but not at the remaining RTP Levels. It should be noted that Table 2 is just an example for the purpose of explanation and whether to do the operations according to RTP Levels is not limited thereto.

Furthermore, when receiving electricity usage information of other devices that has been included in the smart metering information, the controller 220 may schedule cleaning or charging operations according to predetermined criteria. For example, the controller 220 may schedule the cleaner 110 not to perform cleaning or charging operations during times when other devices are consuming lots of electricity, but to perform cleaning or charging operations during times when other devices are consuming less electricity.

Table 3 illustrates scheduling cleaning or charging operations of the cleaner 110 according to the amount of electricity usage.

TABLE 3

| Washing Machine (400 W) | Refrigerator (300 W) | Television (200 W) | Lighting (50 W) | Air Conditioner (5000 W) | Whether to perform Cleaning or Charging operations |
|---|---|---|---|---|---|
| X | ○ | X | ○ | ○ | X |
| ○ | ○ | ○ | ○ | X | ○ |

Referring to Table 3, received information about power consumed or electricity usages of other devices is represented. The controller 220 may determine whether to allow the cleaner 110 to perform the cleaning or charging operation, based on predetermined criteria. For example, the controller 220 may schedule the cleaner 110 not to perform the cleaning or charging operation if the total amount of electricity usages of the other devices exceeds 2000 W (Watts), and otherwise, schedules the cleaner 110 to perform the cleaning or charging operation. From Table 3, it is seen that in the first case (in the second row of Table 3) where the refrigerator, lighting, and air conditioner is consuming electricity and the total amount of electricity usage comes to 5350 W, the controller 220 schedules the cleaner 110 not to perform the cleaning or charging operation, and in the second case (in the third row of Table 3) where the washing machine, refrigerator, television, and lighting is consuming the electricity but the total amount of electricity usage comes to 950 W, the controller 220 schedules the cleaner 110 to perform the cleaning or charging operation. Table 3 is just an example for the purpose of explanation and the criteria of the total amount of electricity usage of the other devices is not limited thereto.

Next, an example where the external conditions information is personal information is described.

Personal information may include user schedule information or user position information, but is not limited thereto.

The user schedule information refers to personal information management system (PIMS) information. For example, the user schedule information may be schedule information on a calendar provided by an Internet search company (e.g., Google calendar).

Figure 4:
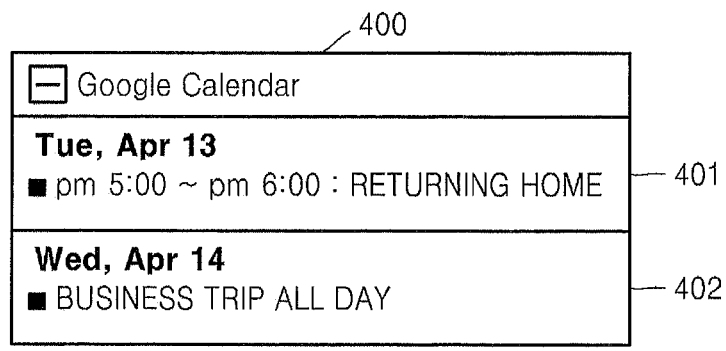
FIG. 4 illustrates user schedule information corresponding to external conditions information, according to the present disclosure.

FIG. 4 illustrates user schedule information corresponding to external condition information, according to the present disclosure.

An example of Google calendar 400 is shown in FIG. 4. Information on Google calendar 400 contains user's schedules for each day. An item 401 on Tuesday, April 13 is displayed showing a user's schedule, "returning home between 5 p.m. and 6 p.m.", and an item 402 on Wednesday, April 14 is displayed showing a user's schedule, "business trip all day".

When the controller 220 receives such information from the personal information providing server 133 through the network interface unit 210, the controller 220 may set up cleaning schedules according to the user's schedule of returning home or going on the business trip. For example, since the user is supposed to return home sometime between 5 and 6 p.m. on April 13, the controller 220 may set up a schedule for the cleaner 110 to start cleaning at 4 p.m. on the same day, and on April 14 when the user's schedule involves a "business trip all day", the controller 220 may set up the schedule for the cleaner 110 not to perform cleaning that day.

The controller 220 may extract user position information by utilizing social networking service information, such as, for example, Foursquare or IM-in.

The internal information collector 230 collects internal information regarding the cleaner 110. The internal information refers to information that the cleaner 110 collects without using any external network. For example, the internal information includes existing cleaning or charging schedules and battery remaining amount information stored in the storage unit 240, or a dust uptake rate that may be determined by the cleaner 110 using a certain sensor. The existing cleaning or charging schedules become an operating base of the cleaner 110, and the battery remaining amount becomes a charging base. In addition, the dust uptake rate becomes an additional cleaning base.

The controller 220 uses the internal information to set up operating schedules of the cleaner 110. For example, if the dust uptake rate per hour is high, thus raising the need for additional cleaning, the controller 220 sets up cleaning schedules to increase the number of time cleaning is performed, and if the battery remaining amount is low, the controller 220 sets up a charging schedule to recharge the cleaner 110 immediately.

Of course, the controller 220 may set up cleaning or charging schedules of the cleaner 110 considering both the external and internal conditions information.

The controller 220 converts the information received from the network interface unit 210 and the internal information collector 230 into a form of common context data. In other words, the controller 220 normalizes the received information to be values of 0 or 1. The controller 220 uses the normalized information to set up operating schedules of the cleaner 110. Furthermore, the controller 110 may store the received information as normalized information values in the storage unit 240, and may store the established operating schedules in the storage unit 240.

If the network interface unit 210 and the internal information collector 230 receive information, they inform the controller 220 about a changed value through a push notification as an Event Form.

The storage unit 240 stores a program and data required for performing the method of controlling operations of the cleaner 110, namely, the method of scheduling operations of the cleaner 110. The program may be loaded into and operated by the controller 220. The data includes the received internal and external conditions information according to the embodiment of the present disclosure, and may include the existing operating schedules, i.e., cleaning and charging schedules of the cleaner 110.

Figure 5:
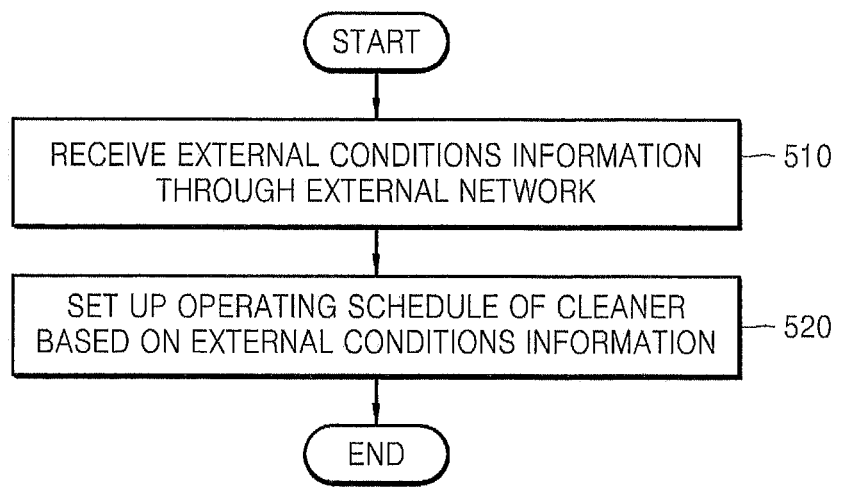
FIG. 5 illustrates a method of controlling operations of the cleaner, according to an embodiment of the present disclosure.

FIG. 5 illustrates a method of controlling operations of the cleaner 110, according to an embodiment of the present disclosure.

Referring to FIG. 5, in operation 510, the apparatus 200 for controlling operations of the cleaner 110 receives external conditions information through the external network 120. The external network 120 may include at least one of Internet, a mobile communications network, a broadcasting network, a cable television network, and a satellite network, but is not limited thereto.

The external conditions information refers to overall information about the external conditions surrounding the cleaner 110. For example, the external conditions information includes weather information, energy information, such as smart metering information, and personal information, such as user schedules.

The weather information includes at least one of information about weather, temperature, humidity, wind velocity, amount of sunshine, and air pollution level, such as a yellow dust level.

A smart grid is a technology that collects energy information, such as electric power consumed by respective devices, through smart metering, thus increasing economic efficiency of energy usage. The smart metering information may include information about a real-time pricing system according to which electricity prices change on an hourly basis, and information about the amount of energy consumed by other devices. Under the real-time pricing (hereinafter, referring to as RTP) system, consumers are billed for the electricity they consume based on hourly prices that have been set by an electricity provider (e.g., KEPCO in Korea).

Personal information may include, but is not limited to, user schedule information or user position information, and any other information about the user.

The user schedule information refers to personal information management system (PIMS) information. For example, the user schedule information may be some schedule information on a calendar provided by an Internet search company (e.g., Google calendar).

The cleaner 110, herein, does not mean a passive device that needs to be held and driven by a user, but is an automatic device that automatically cleans and recharges itself according to a program or schedule. In an embodiment of the present disclosure, the cleaner 110 may be a so-called a robot cleaner.

In operation 520, the apparatus 200 sets up operating schedules of the cleaner 110 based on the external conditions information. In other words, the apparatus 200 may newly create operating schedules of the cleaner 110 based on the external conditions information, or may change stored existing operating schedules of the cleaner 110. The operating schedules of the cleaner 110 refer to cleaning and charging schedules of the cleaner 110.

In particular, the information about the air pollution level, such as the yellow dust level, is information that indicates an increased need for cleaning. Therefore, when the controller 220 receives information about the air pollution level, it sets up an operating schedule, particularly a cleaning schedule, of the cleaner 110.

When the apparatus 200 receives RTP information that is included in the smart metering information, it may schedule cleaning or charging operations of the cleaner 110 based on predetermined criteria. For example, the apparatus 200 may schedule the cleaner 110 not to perform cleaning or charging during higher-priced hours but to perform cleaning or charging during lower-priced hours. In addition, the apparatus 200 may set RTP levels from the RTP information based on predetermined criteria and schedule cleaning or charging operations of the cleaner 110 accordingly. Scheduling by setting the RTP levels may simplify and give higher reliance to the scheduling program than by hourly-based scheduling.

Furthermore, if the apparatus 200 receives information about the amount of electricity usage of other devices, it may schedule the cleaning or charging operations based on predetermined criteria. For example, the apparatus 200 may schedule the cleaner 110 not to perform cleaning or charging if the amount of electricity usage of the other devices is greater than the predetermined criteria, and the apparatus 200 may schedule the cleaner 110 to perform cleaning or charging if the amount of electricity usage of the other devices is less than the predetermined criteria.

If the apparatus 200 receives user schedule information, for example, information that the user is supposed to go on a business trip for 2 days, the apparatus 200 may set up cleaning or charging schedules of the cleaner 110 by canceling existing cleaning schedules, for example.

Figure 6:
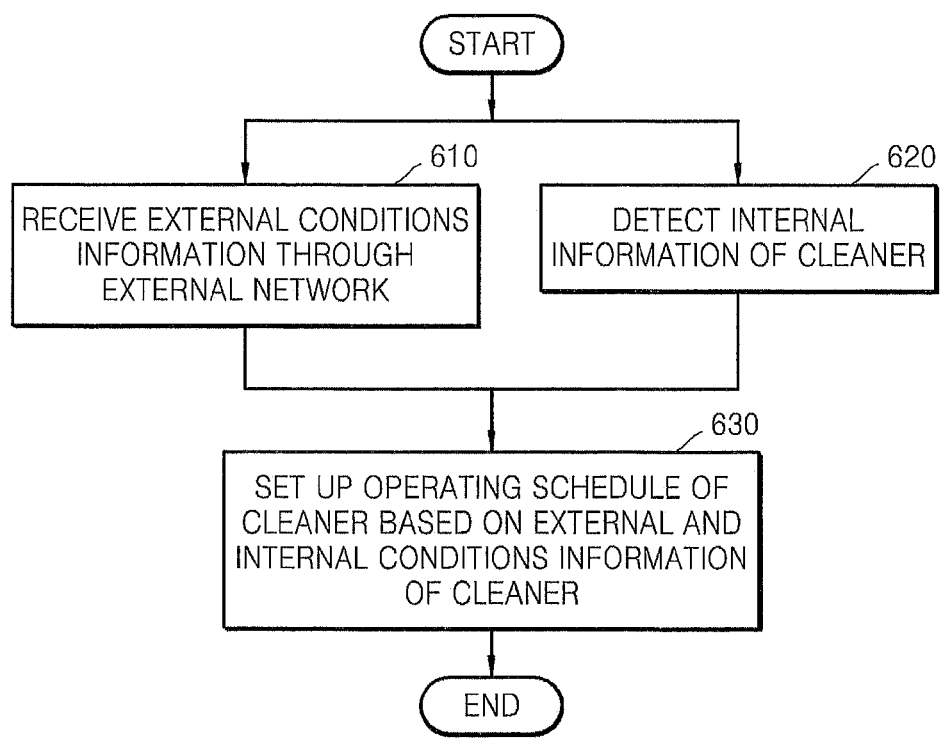
FIG. 6 illustrates a method of controlling operations of the cleaner, according to another embodiment of the present disclosure.

FIG. 6 illustrates a method of controlling operations of the cleaner 110, according to another embodiment of the present disclosure.

Operation 610 of FIG. 6 may be performed in a manner similar to operation 510 of FIG. 5, so a description thereof will be omitted here for brevity.

In operation 620, the apparatus 200 collects internal information regarding the cleaner 110. The internal information refers to information that the cleaner 110 collects without using any external network. For example, the internal information includes existing cleaning or charging schedules and battery remaining amount information stored in the cleaner 110, or a dust uptake rate that may be determined by the cleaner 110 using a certain sensor. The existing cleaning or charging schedules become an operating base of the cleaner 110, and the battery remaining amount becomes a charging base. In addition, the dust uptake rate becomes an additional cleaning base.

In operation 630, the apparatus 200 uses the internal and external conditions information to set up operating schedules of the cleaner 110. The apparatus 200 may set up operating schedules of the cleaner 110 by using only the internal conditions information. For example, if the dust uptake rate per hour is high, thus increasing the need for additional cleaning, the apparatus 200 sets up cleaning schedules to increase the number of times cleaning is performed, and if the battery remaining amount is low, the apparatus 200 sets up a charging schedule to recharge the cleaner 110 immediately. The apparatus 200 may set up cleaning or charging schedules considering both of the external and internal conditions information.

Although not shown in FIGS. 5 and 6, the apparatus 200 converts the internal and external conditions information into a form of common context data. In other words, the apparatus 200 normalizes the received information to be values of 0 or 1. The apparatus 200 uses the normalized information to set up operating schedules of the cleaner 110. Furthermore, the apparatus 200 may store the received information as normalized information values, and may store established operating schedules. In addition, if the apparatus 200 receives information, it sets up operating schedules of the cleaner 110 by informing a changed value as an Event Form.

According to embodiments of the present disclosure, a variety of IT information is utilized for scheduling operations of a cleaner, thus giving more intelligence to the cleaner which may thus be used as an optimized consumer appliance. In addition, smart metering information within a smart grid environment is used for automatic and efficient charging scheduling of the cleaner, thus forming the basis of green appliances.

A program for carrying out the exemplary embodiments of the present disclosure may be implemented as computer readable codes on a computer readable storage medium. Examples of the computer readable storage medium include all kinds of storage devices which can be read by a computer system. The computer readable storage medium comprises, for example, a read only memory (ROM), a random access memory (RAM), a compact disk-ROM (CD-ROM), a magnetic tape, a floppy disk, an optical data storage device, and so on. The computer readable storage medium can also be distributed to a computer system connected to a network to be stored and executed as computer readable program codes.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus to control operations of a cleaner, the apparatus comprising:
   a network interface configured to receive an electricity usage amount of another device;
   a detector configured to detect a dust uptake rate per hour of the cleaner; and
   a controller configured to:
   update one or more scheduled charging calendar dates and times of one or more operating schedules of the cleaner by using the electricity usage amount of another device, the detected dust uptake rate per hour, and current scheduled charging calendar dates and times of the one or more operating schedules of the cleaner.

2. The apparatus of claim 1, wherein the network interface further receives air pollution information,
the controller is further configured to update the one of more operating schedules of the cleaner by further using the air pollution information.

3. The apparatus of claim 1, wherein the network interface is further configured to receive a plurality of information about a real-time pricing system that is based on electricity prices that vary on an hourly basis,
wherein the controller is further configured to update the one or more scheduled charging calendar dates by further using the received plurality of information about a real-time pricing system.

4. The apparatus of claim 1, wherein the controller is further configured to update the one or more operating schedules of the cleaner by further using user schedule information.

5. The apparatus of claim 1, further comprising:
a storage configured to store the one or more operating schedules of the cleaner and the current scheduled charging calendar dates.

6. The apparatus of claim 1, wherein the detector is further configured to detect a remaining battery amount of the cleaner,
wherein the controller is configured to update the one or more scheduled charging calendar dates and times of the one or more operating schedules of the cleaner by further using the detected remaining battery amount of the cleaner.

7. A method to control operations of a cleaner, the method comprising:
receiving an electricity usage amount of another device;
detecting a dust uptake the cleaner; and
updating one or more scheduled charging calendar dates and times of one or more operating schedules of the cleaner by using the received electricity usage amount of the other device, the detected dust uptake rate per hour of the cleaner, and current scheduled charging calendar dates and times of the one or more operating schedules of the cleaner.

8. The method of claim 7, further comprising:
receiving air pollution information,
wherein the updating of one or more scheduled charging calendar dates and times of one or more operating schedules of the cleaner performs by further using the received air pollution information.

9. The method of claim 7, further comprising:
receiving a plurality of information about a real-time pricing system that is based on electricity prices that vary on an hourly basis,
wherein the updating of one or more scheduled charging calendar dates and times of one or more operating schedules of the cleaner performs by further using the received plurality of information about a real-time pricing system.

10. The method of claim 7, wherein the updating of one or more scheduled charging calendar dates and times of one or more operating schedules of the cleaner performs by further using user schedule information.

11. The method of claim 7, further comprising:
storing the current scheduled charging calendar dates and times of the one or more operating schedules of the cleaner.

12. The method of claim 7, further comprising:
Detecting a remaining battery amount of the cleaner,
wherein the updating of one or more scheduled charging calendar dates and times of one or more operating schedules of the cleaner performs by further using the detected remaining battery amount of the cleaner.

13. A non-transitory, computer-readable storage medium having embodied thereon a computer program for executing a method for controlling operations of a cleaner, the method comprising:
receiving an electricity usage amount of another device,
detecting a dust uptake rate per hour of the cleaner; and
updating one or more scheduled charging calendar dates and times of one or more operating schedules of the cleaner by using the received electricity usage amount of the other device, the detected dust uptake rate per hour of the cleaner, and current scheduled charging calendar dates and times of the one or more operating schedules of the cleaner.

* * * * *